(12) United States Patent
Fine et al.

(10) Patent No.: US 10,438,026 B2
(45) Date of Patent: Oct. 8, 2019

(54) SECURITY SYSTEM FOR SOLID-STATE ELECTRONICS

(71) Applicants: Eran Fine, Tel Aviv (IL); Viacheslav Krylov, Holom (IL); Lior Medina, Gan-Yavne (IL)

(72) Inventors: Eran Fine, Tel Aviv (IL); Shlomo Oren, Tel-Aviv (IL); Viacheslav Krylov, Holom (IL); Lior Medina, Gan-Yavne (IL)

(73) Assignees: NANOLOCK SECURITY (ISRAEL) LTD., Yokneam (IL); RAMOT AT TEL AVIV UNIVERISITY LTD., Tel Aviv (IL)

( * ) Notice: Subject to any disclaimer, the term of this patent is extended or adjusted under 35 U.S.C. 154(b) by 6 days.

(21) Appl. No.: 15/756,760

(22) PCT Filed: Sep. 2, 2016

(86) PCT No.: PCT/IL2016/050963
§ 371 (c)(1),
(2) Date: Mar. 1, 2018

(87) PCT Pub. No.: WO2017/037715
PCT Pub. Date: Mar. 9, 2017

(65) Prior Publication Data
US 2018/0260586 A1    Sep. 13, 2018

Related U.S. Application Data

(60) Provisional application No. 62/213,176, filed on Sep. 2, 2015.

(51) Int. Cl.
*G06F 21/86*    (2013.01)
*B81B 7/02*    (2006.01)
(Continued)

(52) U.S. Cl.
CPC ............. *G06F 21/86* (2013.01); *B81B 7/02* (2013.01); *G06F 21/75* (2013.01); *H01L 23/576* (2013.01)

(58) Field of Classification Search
None
See application file for complete search history.

(56) References Cited

U.S. PATENT DOCUMENTS

| | | | | |
|---|---|---|---|---|
| 6,046,659 A | * | 4/2000 | Loo | B81B 3/0072 200/181 |
| 6,787,438 B1 | * | 9/2004 | Nelson | B81B 3/0072 257/254 |

(Continued)

FOREIGN PATENT DOCUMENTS

WO    2007146504 A2    12/2007

OTHER PUBLICATIONS

Dynamic Trapping Experiment in an Electrostatically Actuated Initially Curved Beam, Proceedings of the 18th International Conference on Solid-State Sensors, Actuators and Microsystems: Transducers 2015, Anchorage, AK, Jun. 21-25, 2015, pp. 784-787. (Retrieved on Dec. 25, 2016). Retrieved from the internet <https://www.researchgate.net/profile/Lior Medina/publication/278859310_Dynamic_trapping experiment_in_an_elctrostaticlly_actuated_initially_curved_beam/links/55e0cd5108ae6abe6e8a0f9b.pdf Medina L. et al., Aug. 28, 2015 (Aug. 28, 2015).

(Continued)

*Primary Examiner* — Minh D A
*Assistant Examiner* — James H Cho
(74) *Attorney, Agent, or Firm* — Morgan, Lewis & Bockius LLP

(57) ABSTRACT

In accordance with various embodiments of the present invention, mechanical systems incorporating movable microelectromechanical (MEMS)-based features, e.g., can- (Continued)

tilevers or suspended micron- and submicron-scale beams are utilized to secure solid-state devices such as controllers, microcontrollers, central processing units (CPUs), solid-state storage drives, and memory cards. In various embodiments of the invention, the beams are double-clamped, initially curved (or "pre-buckled") segments that are provided within the solid-state device (e.g., on the top layer thereof) prior to encapsulation and packaging of the device.

13 Claims, 7 Drawing Sheets

(51) Int. Cl.
*H01L 23/00* (2006.01)
*G06F 21/75* (2013.01)

(56) References Cited

U.S. PATENT DOCUMENTS

| | | | |
|---|---|---|---|
| 7,795,778 B2* | 9/2010 | Ikehashi | B81B 3/0021 200/181 |
| 9,432,298 B1* | 8/2016 | Smith | H04L 49/9057 |
| 2012/0146684 A1* | 6/2012 | Ebbers | G06F 21/87 326/8 |
| 2012/0268985 A1* | 10/2012 | Chang | H03H 9/2457 365/164 |
| 2015/0130509 A1 | 5/2015 | He et al. | |

OTHER PUBLICATIONS

Shielding and securing integrated circuits with sensors. In 2014 IEEE/ACM International Conference on Computer-Aided Design (ICCAD) (pp. 170-174 ). IEEE. (Retrieved on: Dec. 25, 2012 ) Retrieved from the internet:< https://pdfs.semanticscholar.org/Oeda/a5ecl87a6ealb35c5784db89a23d0f642c0a.pdf> Shahrjerdi, D., et al.Sep. 30, 2014 (Sep. 30, 2014)Third page—section C: C. Thwarting mechanical attacks using NEMS/MEMS cantilevers.

International Search Report and Written Opinion issued in a corresponding International Application No. PCT/IL2016/050963 dated Dec. 28, 2016.

* cited by examiner

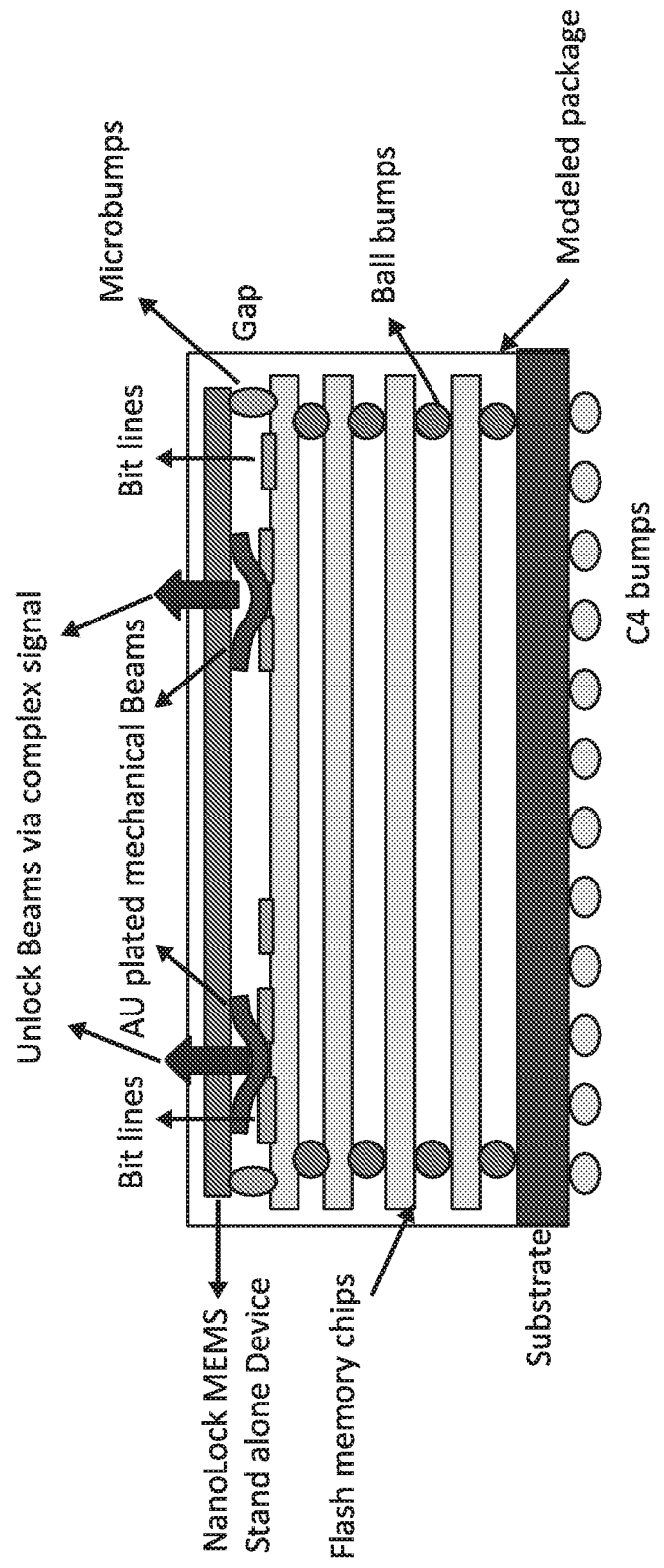

Fig. 2A
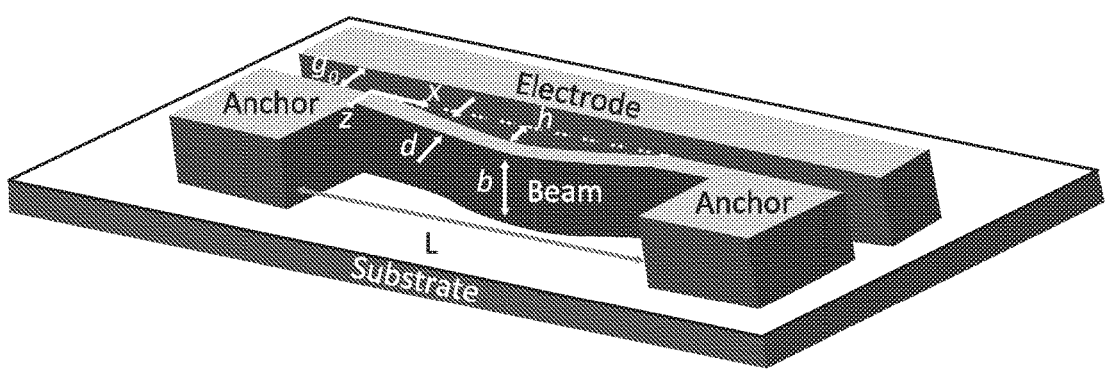
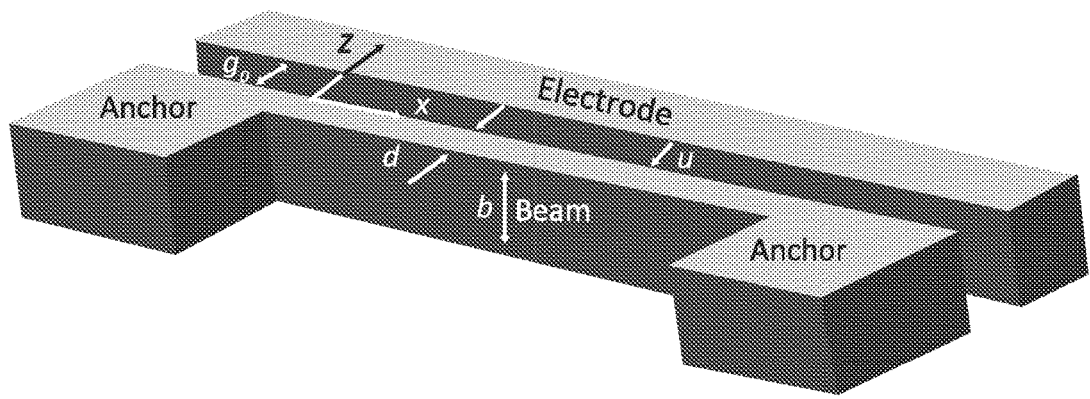
Fig. 2B

SECURITY SYSTEM FOR SOLID-STATE ELECTRONICS

TECHNICAL FIELD

In various embodiments, the present invention relates to security systems for solid-state devices such as processors, controllers, or memory chips, in particular mechanical systems not relying entirely on software-based protection.

BACKGROUND ART

Solid-state devices, e.g., controllers, processors (e.g., CPUs), solid-state storage drives and flash memory cards, have become ubiquitous due to their convenience and large data-storage capacity. However, the very features that make the use of solid-state devices attractive render these devices vulnerable to attack. Large amounts of valuable data may be stored on solid-state memory devices, for example, which may then be innocently misplaced or maliciously stolen by a user. Existing systems for securing the data on solid-state devices, such as encryption protocols and/or passwords, tend to be solely software-based. However, such security systems may be broken (i.e., hacked) by unauthorized parties, leading to loss of valuable data. Therefore, there is a need for security systems for solid-state devices that address the shortcomings of software-based solutions while preventing data access by unauthorized parties and enabling access by authorized parties.

SUMMARY OF INVENTION

The present invention relates to a solid-state device comprising microcircuitry including a pair of electrically isolated conductors; a beam substrate; and one or more beams each suspended from the beam substrate and in contact with, and short-circuiting, the conductors to thereby prevent operation of the microcircuitry, wherein each beam is responsive to an unlocking signal to deflect away from, and out of contact with, the conductors.

In some embodiments, the device further comprises a controller for providing the unlocking signal to each beam.

In some embodiments, the device further comprises, for each beam, (i) a sense electrode for sensing a position of the beam, and (ii) one or more actuating electrodes for deflecting the beam.

In some embodiments, the controller is configured to permanently disable the device if a sense electrode senses (i) removal of at least a portion of a beam, (ii) defection of the beam of a magnitude greater than that resulting from the unlocking signal, or (iii) contact between the sense electrode and a beam.

In some embodiments, the unlocking signal is a two-step signal defined by $$V(t)=V_1 H(t)-(V_1-V_2)H(t-t_1),$$

wherein $V_1$ is a first applied voltage applied for a time $t_1$, $V_2$ is a second applied voltage applied after time $t_1$, and $H(t)$ is the Heaviside step function.

In some embodiments, at least one of the conductors comprises an input/output contact for the microcircuitry.

In another aspect, the present invention further relates to a memory device comprising a memory array comprising (i) a plurality of data-storage locations, and (ii) a plurality of bit lines for accessing the plurality of data-storage locations; a beam substrate; and one or more beams each suspended from the beam substrate and in contact with two or more bit lines, wherein each beam is responsive to an unlocking signal to deflect away from, and out of contact with, the two or more bit lines.

In some embodiments, the device further comprises a controller for providing the unlocking signal to each beam.

In some embodiments, the device further comprises, for each beam, (i) a sense electrode for sensing a position of the beam, and (ii) one or more actuating electrodes for deflecting the beam.

In some embodiments, the controller is configured to erase the memory array if a sense electrode senses (i) removal of at least a portion of a beam, (ii) defection of the beam of a magnitude greater than that resulting from the unlocking signal, or (iii) contact between the sense electrode and a beam.

In some embodiments, the unlocking signal is a two-step signal defined by $$V(t)=V_1 H(t)-(V_1-V_2)H(t-t_1),$$

wherein $V_1$ is a first applied voltage applied for a time $t_1$, $V_2$ is a second applied voltage applied after time $t_1$, and $H(t)$ is the Heaviside step function.

In another aspect, the present invention further relates to a method of utilizing a memory array locked by one or more suspended beams, the method comprising:
  applying an unlocking signal to one or more beams suspended over the memory array, thereby unlocking the memory array; and
  thereafter, accessing data stored in the memory array.

In some embodiments, the one or more beams are each in contact with one or more bit lines of the memory array prior to application of the unlocking signal, and
  the one or more beams each do not contact the one or more bit lines during application of the unlocking signal.

In some embodiments, the unlocking signal is a two-step signal defined by $$V(t)=V_1 H(t)-(V_1-V_2)H(t-t_1),$$

wherein $V_1$ is a first applied voltage applied for a time $t_1$, $V_2$ is a second applied voltage applied after time $t_1$, and $H(t)$ is the Heaviside step function.

In some embodiments, applying a signal other than the unlocking signal to one or more beams results in at least one of (i) failure to unlock the memory device or (ii) erasure of data stored on the device.

BRIEF DESCRIPTION OF DRAWINGS

FIG. 1 schematically illustrates a security system in accordance with embodiments of the present invention, in the locked configuration, implemented within an exemplary solid-state memory device.

FIGS. 2A-2B illustrate a beam in accordance with embodiments of the present invention in the as-fabricated, locked configuration (FIG. 2A) and in the unlocked configuration (FIG. 2B).

FIG. 6A illustrates the deflection of the midpoint of a beam (in arbitrary units) as a function of time for each of the three different two-step signals depicted in FIG. 6B.

MODES FOR CARRYING OUT THE INVENTION

Figure 3:
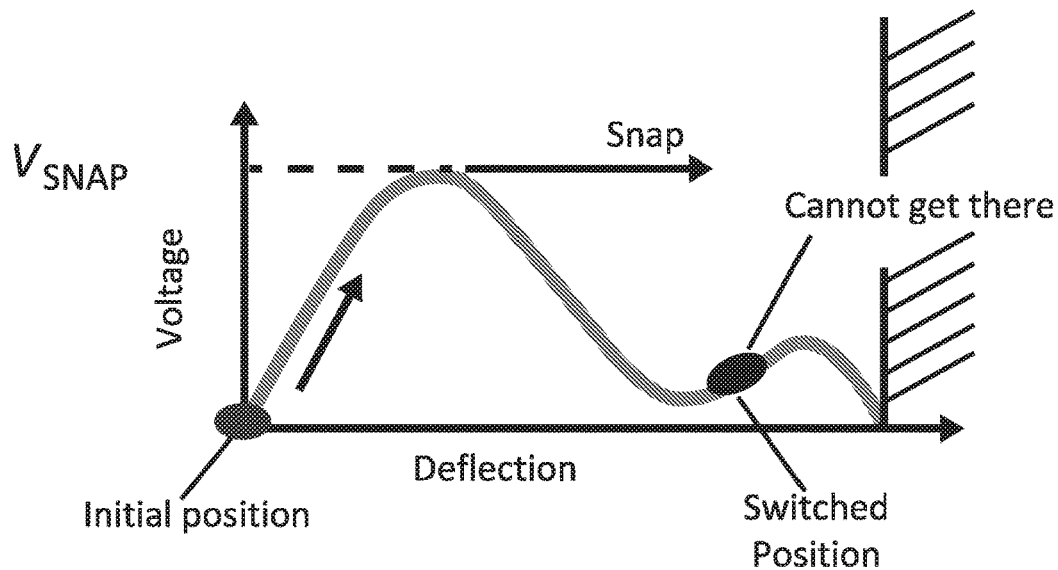
FIG. 3 summarizes the behavior of a beam in accordance with embodiments of the present invention as a function of applied voltage.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

In accordance with various embodiments of the present invention, mechanical systems incorporating movable microelectromechanical (MEMS)-based features, e.g., cantilevers or suspended micron- and submicron-scale beams are utilized to secure solid-state devices such as controllers, microcontrollers, central processing units (CPUs), solid-state storage drives, and memory cards. In various embodiments of the invention, the beams are double-clamped, initially curved (or "pre-buckled") segments that are provided within the solid-state device (e.g., on the top layer thereof) prior to encapsulation and packaging of the device. The beams are electrostatically actuated into different conformations that control access to the device, e.g., to the information stored in a memory device. In the as-assembled, unactuated state, the pre-buckled beams short-circuit a portion of the secured device—e.g., two or more of the bit lines of a memory device, "locking" the device and preventing access to information stored on the device. Aspects of the ensuing discussion focuses on memory devices as a representative application environment, but it should be understood that the invention has broad applicability across a range of devices with microcircuitry, including, e.g., controllers, microcontrollers, CPUs, etc. The term "bit line" is herein utilized to refer to any control line within a memory device, and thus may correspond to a bit line or a word line as those terms are conventionally utilized.

As detailed in L. Medina, et al., "Dynamic Trapping Experiment in an Electrostatically Actuated Initially Curved Beam," Proceedings of the 18th International Conference on Solid-State Sensors, Actuators and Microsystems: Transducers 2015, Anchorage, Ak., Jun. 21-25, 2015, pp. 784-787 (the "Medina reference," the entire disclosure of which is incorporated by reference herein), beams in accordance with embodiments of the present invention have a second stable state, characterized by less deflection of the center of the beam (or deflection in the direction opposite that of the initial state), that is accessible only via application of a two-step signal (e.g., voltage) tailored to the geometry and/or other properties of the beam. When the beams are actuated into this second state, the solid-state device is unlocked and may be operated, e.g., data stored on the device may be accessed. Application of a voltage not matching the specific "unlocking voltage" (e.g., a static voltage or a dynamic voltage resulting from attempted operation of the memory device) results in either the beam remaining in the locked configuration or deflecting into a "pull-in" state (characterized by a larger amount of deflection than that required to unlock the beam), which may be utilized to trigger an erase cycle for the memory device, destroying the data stored therewithin. Attempts to tamper with or disable the beams may also be detected and utilized to trigger an erase cycle. In this manner, embodiments of the present invention may, without depending on software-based security, secure data stored on solid-state memory devices even in the event that the devices are misplaced or stolen.

FIG. 1 schematically illustrates a security system in accordance with embodiments of the present invention, in the locked configuration, implemented within an exemplary solid-state memory device.

As shown, one or more dual-suspended, initially curved beams are fabricated in or on a substrate (e.g., a semiconductor substrate such as a silicon wafer). For example, the beams may be fabricated by deep reactive ion etching and/or other microelectromechanical (MEMS) fabrication techniques known to those of skill in the art. The beams may include or consist essentially of, for example, highly doped silicon, and the beams may even be coated with a metallic material (e.g., gold) for enhanced conductivity. The beam substrate also typically includes one or more electrodes for controlling and/or sensing the states (i.e., the amounts of deflection) of the beams. The beam substrate may also incorporate a controller that provides various control signals to the memory device, depending upon the state of the beams. The beam substrate is placed above the top layer of the memory device (or the only layer, for a single-layer memory device), and the curved beams each contact two or more of the bit lines of the memory device. (In the example illustrated in FIG. 1, the bit lines are connected in parallel to each of the memory layers disposed beneath the top layer; thus, interactions with the bit lines of the top memory layer also affect layers beneath the top layer.) Thus, in the as-assembled, "locked" state, the curved beams short-circuit bit lines of the memory device, thereby preventing access to the memory stored within the device. Application of a specific unlocking signal (detailed below) causes the beams to deflect upward (i.e., away from the memory layers) into their second stable state, removing the short-circuit paths and enabling normal access to the data stored within the memory device.

As also shown in FIG. 1, the beams and beam substrate are provided during assembly of the memory device itself. The beam substrate is connected to the memory layers of the memory device by, e.g., microbumps or other conductive contacts, and is disposed within the memory device package. Thus, security systems in accordance with embodiments of the present invention may not be easily removed from memory devices, enhancing the security provided by the beams.

FIGS. 2A-2B illustrate a beam in accordance with embodiments of the present invention in the as-fabricated, locked configuration (FIG. 2A) and in the unlocked configuration (FIG. 2B).

FIG. 3 summarizes the behavior of a beam in accordance with embodiments of the present invention as a function of applied voltage.

Figure 4A:
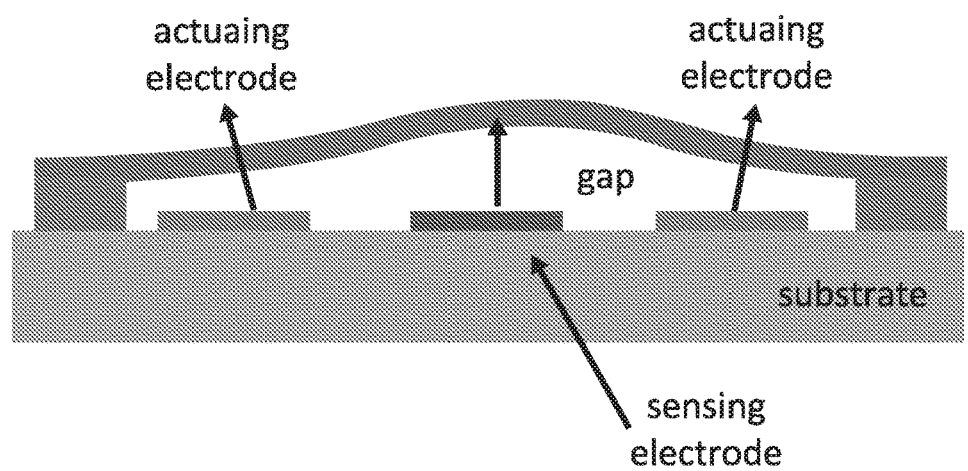
FIGS. 4A-4B are cross-sectional schematics that depict an exemplary beam in the locked state (FIG. 4A) and in the pull-in state (FIG. 4B).
Figure 4B:
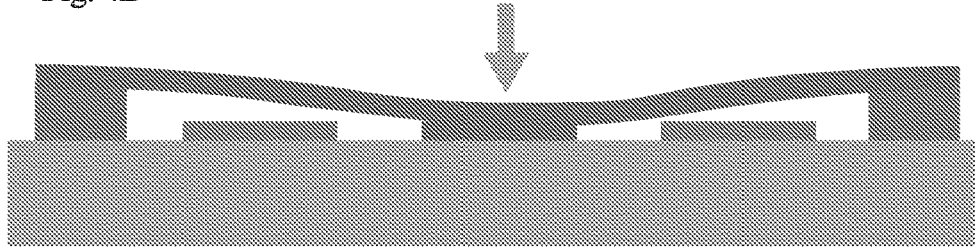

As shown, when the beam is in the as-fabricated, locked state, application of voltage to the beam will result in the beam deforming toward the electrode thereunder (i.e., away from the bit lines of the memory device). However, as also described in the Medina reference, the beam deflection is unstable until the voltage reaches the snap-through voltage Vsnap. If a simple static voltage exceeding Vsnap is applied, the beam snaps to a "pull-in" configuration contacting the electrode. The pull-in configuration may be detected as an unauthorized attempt to access the memory device, and the controller may trigger an erase cycle of the memory device in response, thereby preventing access to the data stored on the memory device. FIGS. 4A-4B are cross-sectional schematics that depict an exemplary beam in the locked state (FIG. 4A) and in the pull-in state (FIG. 4B).

Figure 5:
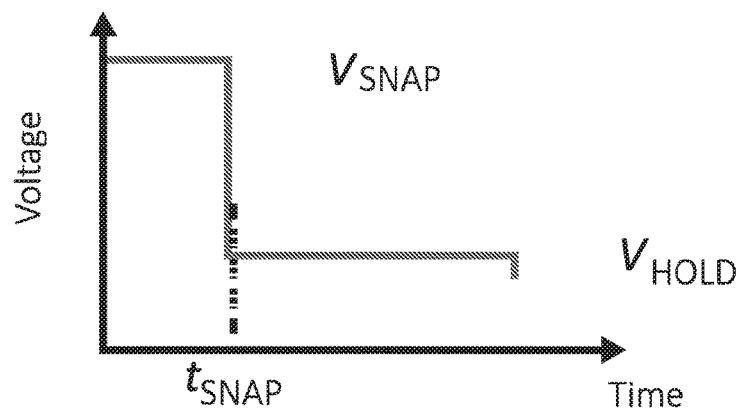
FIG. 5 schematically depicts an embodiment of the unlocking signal as a two-step signal.

In order to unlock the security device in accordance with embodiments of the invention, a complex unlocking signal (e.g., voltage) is applied to the beams, deflecting the beams into the stable deflected, "unlocked" state (or "switched position") illustrated in FIG. 3. In various embodiments, the unlocking signal is a two-step signal schematically depicted in FIG. 5.

Figure 6A:
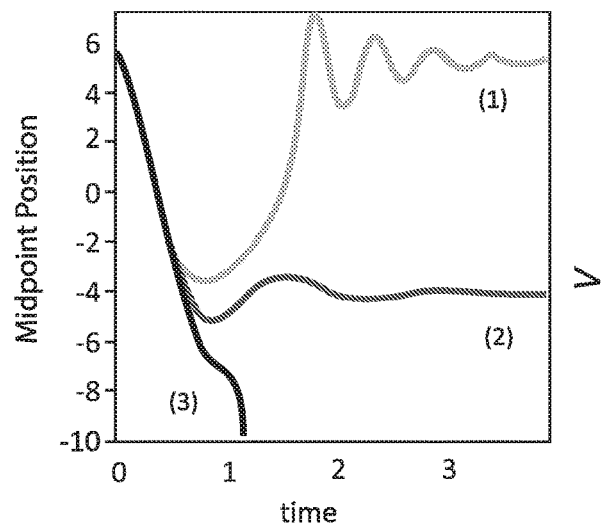
FIGS. 6A-6B depict the beam deflection as a function of various different applied signals, only one of which results in the successful unlocking of the beam.
Figure 6B:
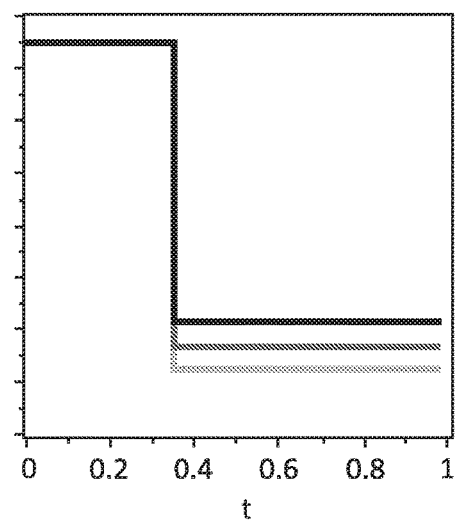

In general, the unlocking signal may include or consist essentially of a first applied voltage (V1) that is approximately equal to or greater than the snap-through voltage Vsnap, followed by a second applied voltage (V2). The first voltage may be applied for a time period less than or approximately equal to the inverse of the natural frequency of the beam (tsnap), and then the second applied voltage is specifically selected to deflect the beam into the unlocked state rather than the beam (1) deflecting back into the locked state or (2) deflecting to an extent sufficient to induce the pull-in configuration. FIGS. 6A-6B depict the beam deflection as a function of various different applied signals, only one of which results in the successful unlocking of the beam.

Figure 7:
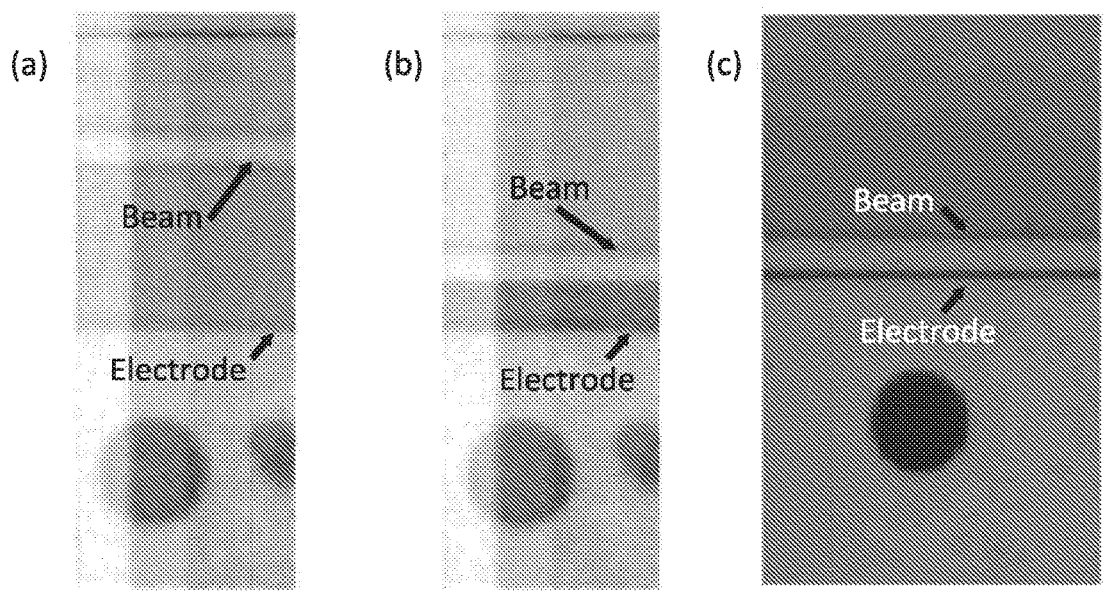
FIG. 7 depicts pictures of the beam in the three states shown in FIGS. 6A-6B.

FIG. 6A illustrates the deflection of the midpoint of a beam (in arbitrary units) as a function of time for each of the three different two-step signals depicted in FIG. 6B. As shown, for each of the two-step signals, the first applied voltage (corresponding to Vsnap) is the same, and only the magnitude of the second applied voltage is changed. In the first case (labeled (1) and corresponding to the lowest second applied voltage), the beam initially deflects away from the memory cell but recovers quickly to its initial undeformed state due to the insufficiently high second applied voltage, and the beam remains locked. In the second case (labeled (2) and corresponding to the middle second applied voltage), the beam deflects away from the memory cell and settles in the unlocked state. In the third case (labeled (3) and corresponding to the highest second applied voltage), the second applied voltage is sufficiently high to induce the beam into the pull-in state, triggering an erase cycle in the memory device. Pictures of the beam in each of these three states are depicted in FIG. 7.

In various embodiments of the present invention, the unlocking signal is a two-step signal given by:

$$V(t)=V\_1 H(t)-(V\_1-V\_2)H(t-t\_1)$$

where V1 and V2 are the first and second applied voltages, respectively, H(t) is the Heaviside step function, and t1 is the time duration of the first step. As known to those of skill in the art, the specific values of V1, V2, and t1 depend on the geometry of the beam. In this manner, beams with different geometries, or collections of beams each having a different geometry, may be utilized with different memory devices, thereby enabling each memory device to have a unique unlocking signal (or collection of unlocking signals) to enable access to the memory device.

In other embodiments of the invention, the locking/unlocking signal may simply be a digital signal, where one value of the signal triggers the locking of the beams (or other MEMS devices), and another value of the signal triggers the unlocking.

Figure 8:
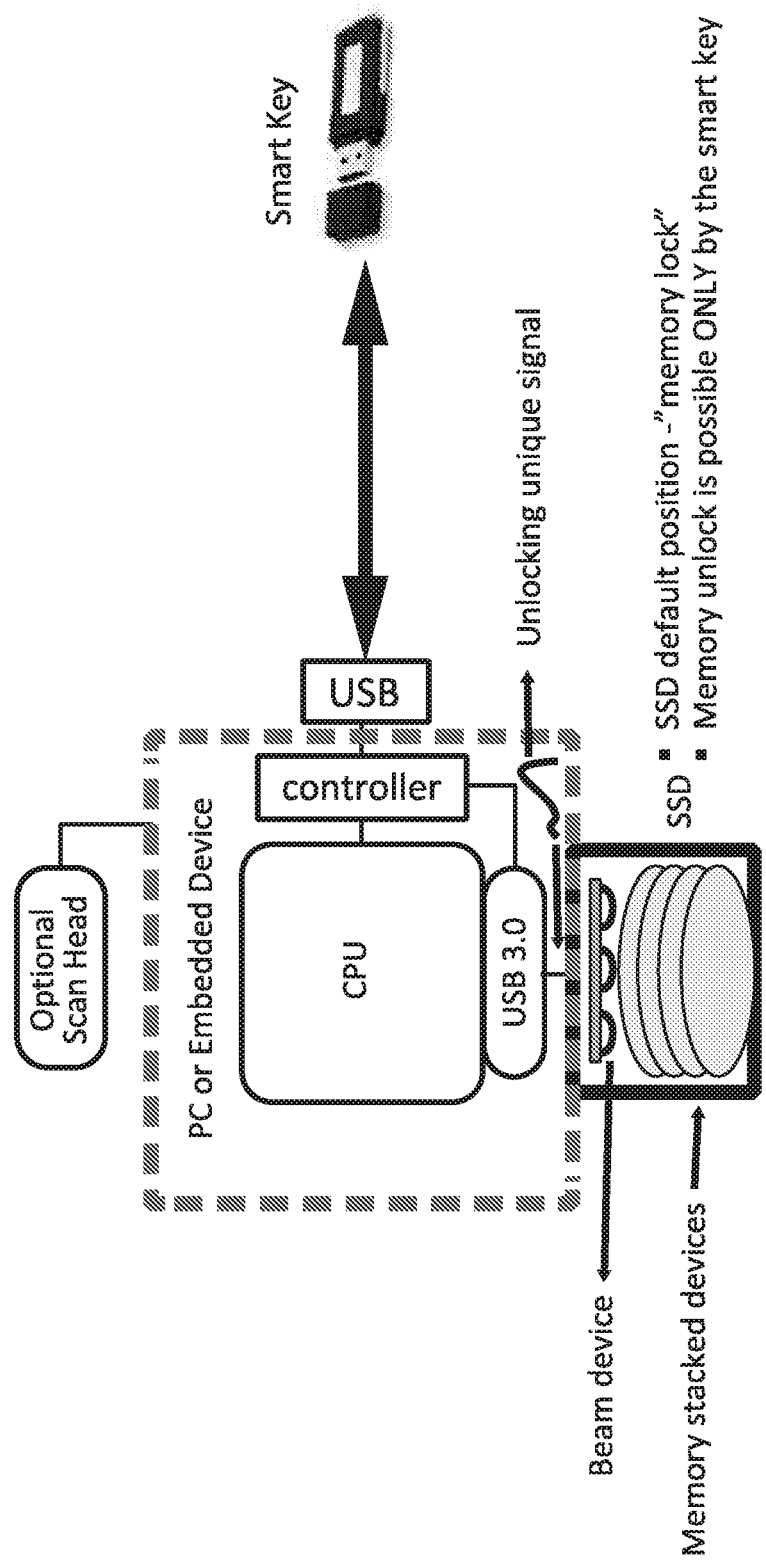
FIG. 8 depicts an exemplary architecture of a computing device incorporating embodiments of the present invention.

FIG. 8 depicts an exemplary architecture of a computing device incorporating embodiments of the present invention.

As seen in FIG. 8, a computing device (e.g., a personal computer, an embedded device, or a hand-held device such as a smart phone, tablet, or laptop computer) interfaces with a memory device that incorporates the beam-based security system detailed herein. The unlocking signal may originate from a "smart key" that may also interface with the computing device. In this manner, access to the data on the memory device may only be enabled when the memory device and its specific smart key are present. As shown, the computing device and/or the memory device may incorporate a controller utilized to supply the unlocking signal to the beams and to control other functionality of the memory device.

The controller may be a general-purpose microprocessor, but depending on implementation may alternatively be a microcontroller, peripheral integrated circuit element, a customer-specific integrated circuit (CSIC), an application-specific integrated circuit (ASIC), a logic circuit, a digital signal processor, a programmable logic device such as a field-programmable gate array (FPGA), a programmable logic device (PLD), a programmable logic array (PLA), an RFID processor, smart chip, or any other device or arrangement of devices that is capable of implementing the steps of the processes of embodiments of the invention. The controller may be monolithically integrated with, and thus a portion of the beam substrate, or the controller may be separate and discrete from the beam substrate (and interconnected thereto by wired or wireless means). Moreover, at least some of the functions of the controller may be implemented in software and/or as mixed hardware-software modules. Software programs implementing the functionality herein described may be written in any of a number of high level languages such as FORTRAN, PASCAL, JAVA, C, C++, C#, BASIC, various scripting languages, and/or HTML. Additionally, the software may be implemented in an assembly language directed to a microprocessor resident in the controller. The software may be embodied on an article of manufacture including, but not limited to, a floppy disk, a jump drive, a hard disk, an optical disk, a magnetic tape, a PROM, an EPROM, EEPROM, field-programmable gate array, CDROM, or DVDROM. Embodiments using hardware-software modules may be implemented using, for example, one or more FPGA, CPLD, or ASIC processors.

In other embodiments of the present invention, the unlocking signal may not itself originate from (i.e., be emitted by) the smart key but from circuitry on or proximate the beam substrate itself. In such embodiments, authorized use of the smart key may trigger an encrypted password from the smart key, and the password triggers the unlocking signal from the integrated electronics. The smart key may incorporate a biometric scanner (e.g., a fingerprint or retinal scanner) keyed to one or more authorized users. In yet additional embodiments, the unlocking signal (which is typically an analog signal) may be digitized into a sequence of samples, which the smart key transmits (in encrypted form) to the integrated electronics in the beam-secured chip. The electronics may include conventional digital-to-analog circuitry to convert the received transmission into the analog unlocking signal, which is then utilized to unlock the beam(s).

Figure 9:
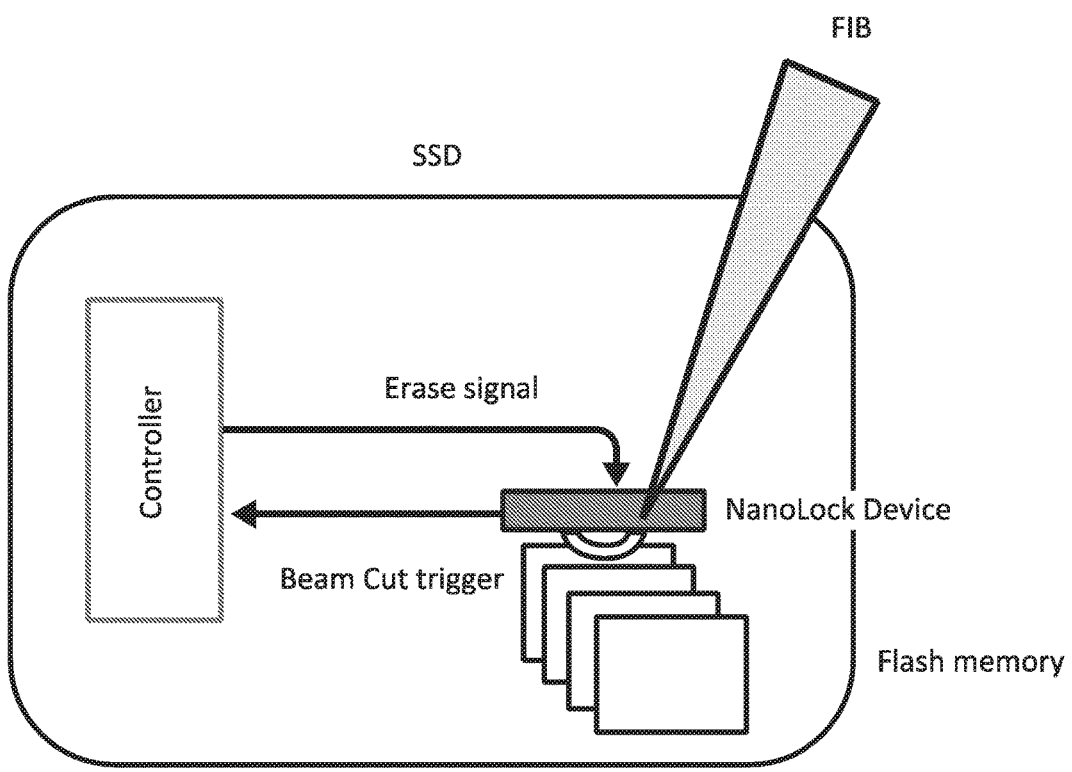
FIG. 9 illustrates an example unauthorized tampering with the beam-based security system by a cutting tool such as a focused ion beam (FIB) that can be utilized in an attempt to cut the beams away from the bit lines of the memory device, a scenario the system protects against.

Embodiments of the present invention also protect against unauthorized tampering with the beam-based security system. For example, a cutting tool such as a focused ion beam (FIB) might be utilized in an attempt to cut the beams away from the bit lines of the memory device, as illustrated in FIG. 9.

Such attempts to cut or remove the beams from the memory device may themselves disable the memory device (e.g., by overheating and/or melting various components of the memory device such as the bit lines themselves). Alternatively, removal of a beam or a portion thereof may be sensed (e.g., by the beam sense electrode) and utilized to trigger an erase cycle of the entire memory device, thus removing the data before it can be accessed.

While aspects of the discussion herein focus on memory devices as a representative application environment, but it should be understood that embodiments of the invention have broad applicability across a range of devices with microcircuitry, including, e.g., controllers, microcontrollers, CPUs, etc.

As shown, the package of the electronic device features a substrate or printed circuit board (PCB) containing conductive lines and/or pads that are electrically connected to the CPU within the device. For example, the conductors of the PCB may correspond to input/output pads for the CPU. As detailed herein, the beams from the beam substrate may be actuated to make contact with the conductors on the PCB (as shown in the figure), thereby shorting various ones of the conductors and locking the electronic device. Upon receipt of the unlocking signal, the beams are actuated into the unlocked position, out of physical contact with the conductors of the electronic device. Thus, advantageously, beam substrates in accordance with embodiments of the invention may be connected (via, e.g., solder balls or other electronic contacts) to electronic devices such as CPUs with their beams positioned to lock various ones of the conductive pads or lines of the electronic device.

It is to be understood that the features of the various embodiments described herein are not mutually exclusive and may exist in various combinations and permutations. As used herein, the terms "approximately" and "substantially" mean ±10%, and in some embodiments, ±5%. The term "consists essentially or" means excluding other materials that contribute to function, unless otherwise defined herein. Nonetheless, such other materials may be present, collectively or individually, in trace amounts.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" means any one or more microprocessors, central processing units (CPUs), computing devices, microcontrollers, digital signal processors, or like devices.

The term "computer-readable medium" refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet. Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The invention claimed is:

1. A solid-state device comprising:
   microcircuitry including a pair of electrically isolated conductors;
   a beam substrate;
   one or more beams each suspended from the beam substrate and in contact with, and short-circuiting, the conductors to thereby prevent operation of the microcircuitry, each beam being responsive to an unlocking signal to deflect away from, and out of contact with, the conductors;
   a controller for providing the unlocking signal to each beam; and
   for each beam, (i) a sense electrode for sensing a position of the beam, and (ii) one or more actuating electrodes for deflecting the beam.

2. The device of claim 1, wherein the controller is configured to permanently disable the device if a sense electrode senses (i) removal of at least a portion of a beam, (ii) defection of the beam of a magnitude greater than that resulting from the unlocking signal, or (iii) contact between the sense electrode and a beam.

3. The device of claim 1, wherein the unlocking signal is a two-step signal defined by $$V(t)=V_1 H(t)-(V_1-V_2)H(t-t_1),$$

wherein $V_1$ is a first applied voltage applied for a time $t_1$, $V_2$ is a second applied voltage applied after time $t_1$, and $H(t)$ is the Heaviside step function.

4. The device of claim 1, wherein at least one of the conductors comprises an input/output contact for the microcircuitry.

5. A memory device comprising:
   a memory array comprising (i) a plurality of data-storage locations, and (ii) a plurality of bit lines for accessing the plurality of data-storage locations;
   a beam substrate; and
   one or more beams each (i) having first and second opposed ends each anchored to the beam substrate and (ii) being dual-suspended from the beam substrate and in contact with two or more bit lines,
   wherein each beam is responsive to an unlocking signal to deflect away from, and out of contact with, the two or more bit lines.

6. The memory device of claim 5, further comprising a controller for providing the unlocking signal to each beam.

7. The memory device of claim 5, wherein the unlocking signal is a two-step signal defined by $$V(t)=V_1 H(t)-(V_1-V_2)H(t-t_1)$$

wherein $V_1$ is a first applied voltage applied for a time $t_1$, $V_2$ is a second applied voltage applied after time $t_1$, and $H(t)$ is the Heaviside step function.

8. A memory device comprising:
   a memory array comprising (i) a plurality of data-storage locations, and (ii) a plurality of bit lines for accessing the plurality of data-storage locations;
   a beam substrate;
   one or more beams each suspended from the beam substrate and in contact with two or more bit lines, each beam being responsive to an unlocking signal to deflect away from, and out of contact with, the two or more bit lines;
   a controller for providing the unlocking signal to each beam; and
   for each beam, (i) a sense electrode for sensing a position of the beam, and (ii) one or more actuating electrodes for deflecting the beam.

9. The memory device of claim 8, wherein the controller is configured to erase the memory array if a sense electrode senses (i) removal of at least a portion of a beam, (ii) defection of the beam of a magnitude greater than that resulting from the unlocking signal, or (iii) contact between the sense electrode and a beam.

10. A method of utilizing a memory array locked by one or more beams suspended over a substrate, the method comprising:
    applying an unlocking signal to one or more beams each (i) having first and second opposed ends each anchored to the substrate and (ii) being dual-suspended over the memory array, thereby unlocking the memory array; and
    thereafter, accessing data stored in the memory array.

11. The method of claim 10, wherein the unlocking signal is a two-step signal defined by $$V(t)=V_1 H(t)-(V_1-V_2)H(t-t_1),$$

wherein $V_1$ is a first applied voltage applied for a time $t_1$, $V_2$ is a second applied voltage applied after time $t_1$, and $H(t)$ is the Heaviside step function.

12. A method of utilizing a memory array locked by one or more suspended beams, the method comprising:
    applying an unlocking signal to one or more beams suspended over the memory array, thereby unlocking the memory array; and
    thereafter, accessing data stored in the memory array, wherein:
    the one or more beams are each in contact with one or more bit lines of the memory array prior to application of the unlocking signal, and
    the one or more beams each do not contact the one or more bit lines during application of the unlocking signal.

13. The method of claim 12, wherein applying a signal other than the unlocking signal to one or more beams results in at least one of (i) failure to unlock the memory device or (ii) erasure of data stored on the device.

* * * * *